XR 3,909,536

United State

Watson et al.

[11] 3,909,536

[45] Sept. 30, 1975

[54] AUDIENCE SURVEY SYSTEM

[75] Inventors: Douglas John Watson; Peter Parkinson, both of Ottawa, Canada

[73] Assignee: Northern Electric Company Limited, Montreal, Canada

[22] Filed: May 6, 1974

[21] Appl. No.: 467,267

[52] U.S. Cl. ................................ 179/2 AS; 325/31
[51] Int. Cl.² ........................................ H04M 11/06
[58] Field of Search ............. 179/2 AS, 1 AT, 18 F; 325/31; 178/DIG. 13; 340/253 P

[56] References Cited

UNITED STATES PATENTS 3,502,813 3/1970 Walker ............................ 179/2 AS
3,781,483 12/1973 Deisch ............................. 179/18 F

*Primary Examiner*—Kathleen H. Claffy
*Assistant Examiner*—C. T. Bartz
*Attorney, Agent, or Firm*—Frank Turpin

[57] ABSTRACT

An incasting system which makes possible an interactive participative broadcasting system is described. A plurality of incasting signal generators are each located at respective ones of a plurality of sources which are connected to a central sink via respective communication paths. Detector means located at the central sink are each responsive to the signal which may appear on any one of a plurality of the communication paths.

11 Claims, 6 Drawing Figures

AUDIENCE SURVEY SYSTEM

This application relates generally to communication systems and more particularly to an incasting system using the telephone network.

The term incasting is used to describe the communications function that is the opposite of broadcasting; that is, the inward flow of information from many sources to a common destination.

Generally, communications is the conveyance of information from sources to sinks. A first mode of communication may be described as the flow of information from a single source to a single sink, for example, a conversation between two individuals. A second mode of communication is characterized by the flow of information from a single source to many sinks. The term broadcasting may be employed to define such a system whether the media of transmission is radio, television or the post office (circulars, magazines, etc.). Finally, the term incasting may be used to define the mode of communication wherein the flow of information is from many sources to a single sink.

The existing incasting services have been implemented using a variety of techniques. Some systems use the call-in technique, i.e. radio call-in programs and telethons, wherein a large number of people call a central sink on a given signal. This causes the central office where the sink is located to be immediately jammed with calls and causes the majority of incasters to be blocked out. Other systems which are used for political polls, television ratings, consumer product surveys, etc., employ the call-out technique whereby attendants call the participants and query them on their vote. Since this technique is not automated, it is very slow and can only be used where the number of participants is limited. Finally, another technique uses automatic call-out, e.g. meter reading wherein a sophisticated machine at a central office interrogates transponders located on the subscriber's premises. Such a system requires the continuous use of central office common control equipment thereby decreasing its normal call handling capacity. The latest technique to be developed also makes use of the telephone network as the incasting communication system. The responders are required to access the sink in the conventional manner. The calls are switched to respective voice recognition systems in accordance with the directory number dialled and the reply is identified and registered. In addition to being very expensive, this system suffers from the usual problems associated with the use of the telephone system for functions other than conventional service.

None of the existing incasting techniques provide the facility for dialogue between the sink and the sources. For such a system to exist, the speed of the incast must be approximately the same as the speed of the broadcast. The achievement of that goal results in the realization of the concept of interactive participative broadcasting. That is, a poll directed at the public at large may be conducted on radio and television and the answers returned to the pollster in a matter of seconds.

It is a general object of this invention to provide an incasting system which makes it possible to achieve an interactive participative broadcasting system which provides for fast response, and which is practical and economical. The prime requirement of such a system is that a two-way communication system be available.

According to the invention, the broadcasting systems, e.g. radio and television, provide a one-way communication path from the pollster to the public while the telephone system, particularly the subscriber loops, provides the return communication path to the pollster.

The prior art incasting systems employ the telephone network in a manner resembling its conventional mode of operation. That is, there is a one-to-one relationship between the incast sources and the sinks. A receiver or detector circuit is provided at the sink for each subscriber loop on which an incast signal may appear. In accordance with this invention, each detector circuit at the sink is responsive to the incast signal appearing on any one of a plurality of communication paths between the sources and the sink. A detector means located at the central office inductively detects the presence of incast signals on a plurality of lines and therefore has no electrical contact with the subscriber loops. Its installation requires no interruption of service and it cannot pick up conversations on the telephone line, thereby insuring privacy to the subscriber.

However, the use of the telephone subscriber loops for the transmission of signals extraneous to the conventional use of the telephone set presents serious problems if the normal operation of the telephone system is not to be altered and the service degraded. For example, the application of a pulsed signal to the subscriber loop generates noise in that loop directly and in other loops by crosstalk. Another problem is that the connection of a signal path to ground at or near the end of a subscriber loop will enable longitudinally induced voltages in the loop to cause current to flow and thus result in undesired noise in the talking path. A further problem is that the connection of any circuit element between tip and ring, or between either and ground, of less than several thousands of ohms equivalent direct current resistance will cause failure indications to occur when that line is subjected to automatic line insulation testing (ALIT).

The invention circumvents these problems by providing an incast transmitter located at each of the incast sources for generating and transmitting on a respective one of the communication paths, a signal which has predetermined characteristics. The signal comprises one or more current pulses shaped such that the frequencies most likely to cause noise and crosstalk are suppressed. The signal is controlled by a current regulator (which inherently has a high internal a-c impedance). and is applied to the telephone line between one side thereof and local ground.

The system of the invention also exhibits novel circuit techniques. The incast signal generator is loop powered and presents a very high impedance to the loop at all times thereby preventing loading of the subscriber loops. The signal generator may also be provided with circuit means to prevent multiple responses on the same question and to inhibit the generation of noise on the telephone line due to "playing" with the reply key. In addition, the generator may provide visual feedback to the user to confirm that the intended reply has been sent.

An example embodiment of the invention will now be described in conjunction with the drawings in which.

Figure 1:
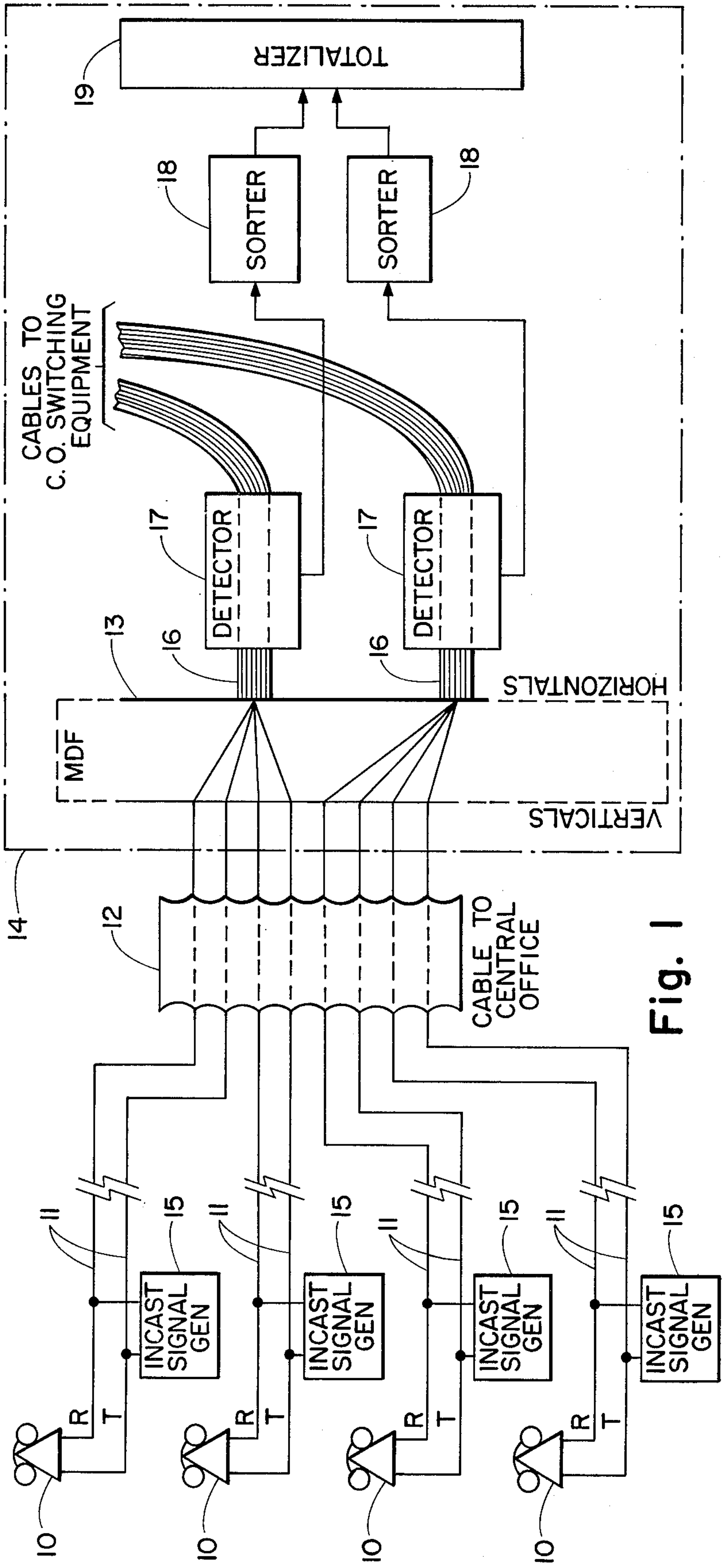
FIG. 1 is a block diagram of an incasting system in accordance with the invention.

FIG. 1 shows a plurality of subscriber telephone sets 10 each connected to a respective subscriber loop 11. The subscriber loops 11 eventually form a cable 12 which is terminated on the verticals of a main distributing frame (MDF) 13 in a central office 14. The horizontals of the MDF are formed into cables (typically 100 pairs each) for connection to the central office switching equipment. All of the above apparatus is conventional equipment which is to be found in any telephone system. This apparatus serves as the return communication link for the incasting system of the present invention.

An incast signal generator circuit 15 is connected to the telephone line 11 in parallel with each telephone set 10. The signal generator circuit 15 may be incorporated into the telephone set 10; however, for practical reasons, it may ideally take the form of a separate unit connected to the telephone line via an electrical cable and a jack connector. In this way, the signal generator circuit 15 may be placed in the home at a location proximate the broadcast receiver, and/or the seating location of the incaster.

As described further below in conjunction with FIGS. 2 and 3, the signal generator circuit 15 is powered from the telephone line and therefore requires only a pair of wires connected thereto in addition to a connection to the local ground. Physically, the circuit 15 may be a small hand-held box with a manually operated switch means which allows the incaster to indicate a "yes" or "no" reply. It may also be provided with a visual indicator which informs the operator that the desired signal has been sent.

The wires coming out of the MDF 13 are typically formed into one hundred pair cables 16 for connection to the switching equipment of a central office. A detector means 17 is provided for each of these cables. As illustrated in FIG. 1, the detector means 17 is adapted to perform an "OR" logic function on the incast signals thereby providing a 100-to-1 concentration thereof and reducing the detector equipment cost by a factor corresponding to the number of pairs in each cable 16 in comparison to using a detector means for each subscriber loop.

The output signal from each of the detector means 17 is fed to a respective reply sorter 18 which determines if the reply is positive or negative, and which provides an output signal which may be fed to a totalizer 19 from which the total number of positive and negative replies may be transmitted to any destination using conventional methods. The totalizer 10 may comprise any conventional counting circuit such as are well known in the art.

The incasting signal generator 15 is required to generate a unipolar current pulse having a predetermined risetime and a predetermined falltime whereby a minimum of impulse noise is caused to be generated. FIG. 2 shows, in broken line, the current vs time relationship of an ideal single unipolar current pulse which causes very little disturbance to the telephone system and yet permits satisfactory operation of this incasting system. The solid line shows a near approximation to the idealized broken line curve and it represents a pulse which may be generated using practical circuitry.

Figure 2:
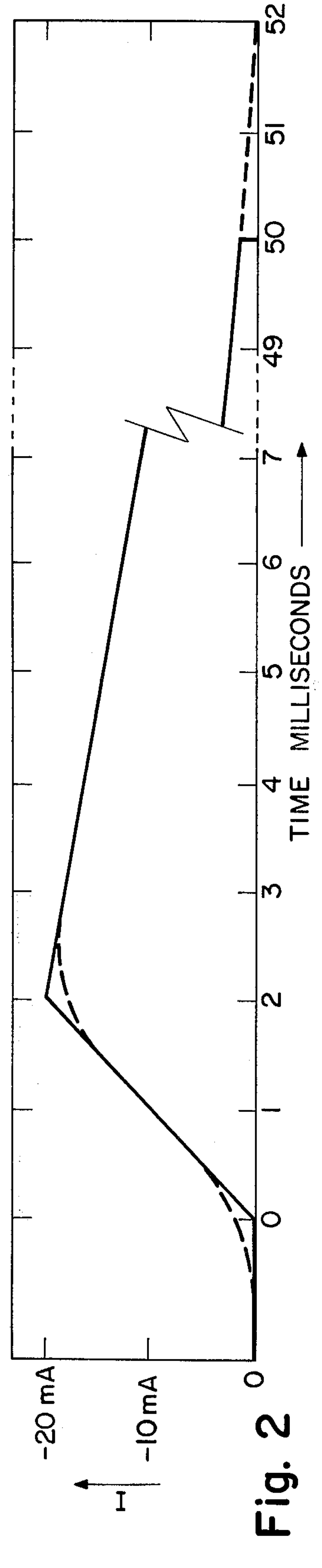
FIG. 2 is a waveform diagram of the signal generated by the incast signal generator circuit of FIG. 1.

As may be observed from FIG. 2, the pulse has a sloped risetime of approximately 2 milliseconds and a peak value of approximately 20 milliamperes. From this peak value, the pulse falls towards ground in approximately 50 milliseconds. Of course, these values only serve to indicate the desired shape of the current pulse to be generated by the circuit 15 in order that a minimum of noise interference be generated.

Figure 3:
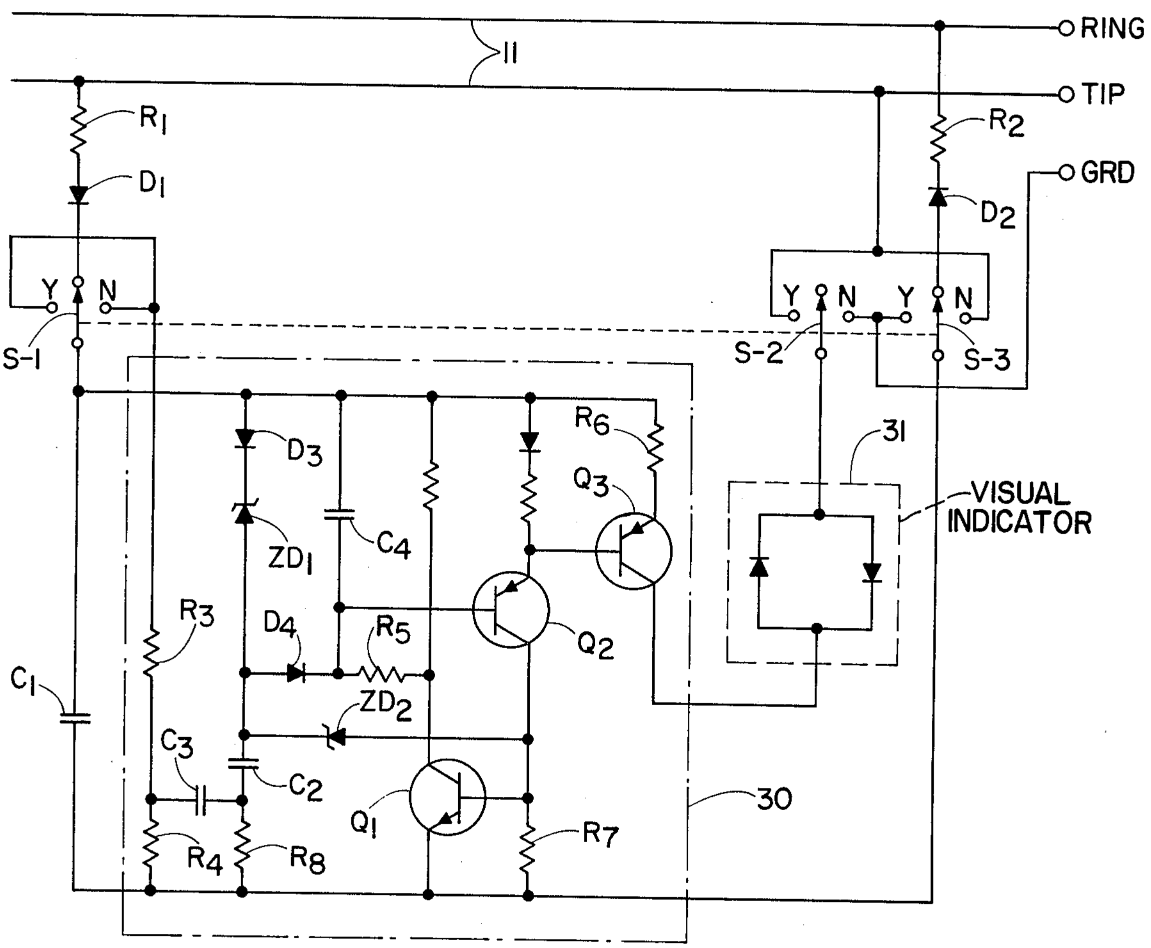
FIG. 3 is a schematic diagram of the incast signal generator circuit shown in FIG. 1.

FIG. 3 is a schematic diagram of the incasting signal generator circuit 15 shown in FIG. 1. This circuit is adapted to produce the waveform of FIG. 2 as a positive signal or a signal. The The latter is simply the mirror image to that shown in FIG. 2. FIG. 3 shows a key S having three sets of transfer contacts S-1, S-2 and S-3. Make contacts Y and N correspond to positive and negative replies respectively. Each of these sets of contacts may be mechanically linked so that they operate in unison. However, contacts S-1 should be late-make in the Y and N positions. In the center position, the key S serves to connect a capacitor C1 to the ring and tip leads of the subscriber loop 11 through resistances R1 and R2 and diodes D1 and D2. These resistances may have a large value (e.g. 120 kilohm each) so that the signal generator 15 does not load the loop 11. In the Y and N positions, the capacitor C1 is connected to the local ground and to one side of the subscriber loop 11 through a current pulse generator and shaper 30 and a visual indicator 31.

The visual indicator 31 may conveniently be a red-green light-emitting diode package such as are commercially available. When a positive-going current pulse is generated, the green diode is energized and when a negative-going current pulse is generated, the red diode is energized. This indicator informs the voter that his reply has been sent and confirms the nature thereof.

The circuit of the current pulse generator and shaper 30 may be best described by describing the operation of the circuit of FIG. 3. With the voting key S in the center position and with the associated telephone set on-hook, capacitor C1 charges through resistors R1 and R2 and diodes D1 and D2 from the central office battery supply of —48 volts connected to the ring lead. Capacitor C2 also charges up through these elements but its charging path also includes diode D3 and zener diode ZD1 which allow capacitor C2 to charge only to the voltage reached across capacitor C1 less the breakdown voltage of zener diode ZD1.

When the key S is operated to the Y or N positions, the capacitor C1 is disconneced from across the loop 11 and is connected through the shaping circuitry to the tip lead only and to the local ground so that the generated positive or negative current pulse will be applied to the tip lead. As the contacts of the key S close, a positive start pulse is generated at the base of transister Q1, via resistor dividing network R3 and R4, capacitors C2 and C3 and diode ZD2. This pulse allows current to flow through Q1, part of which flows through R5. A capacitor C4 charges at a predetermined rate until diode D4 starts to conduct thereby holding the voltage at that point to the value existing on capacitor C2. This voltage ramp applied to the base of transistor Q2, and via the emitter of Q2 to the base of transistor Q3, causes a current ramp of a predetermined rate (in this embodiment, 10 milliamperes per millisecond, 20 milliamperes maximum) to be passed by the collector of transistor Q3 due to the current feedback provided by emitter resistor R6. The collector current of transistor Q2 is applied to resistor R7 and the base of transistor Q1 to maintain it in a saturated "on" condition after the decay of the start pulse. Capacitor C1 is now discharging through resistor R6, transister Q3, the indicator 31 and the tip lead. The magnitude of the discharge current is controlled by resistor R6 and the difference between the voltages remaining on capacitors C1 and C2. Capacitor C2 is supplying a small amount of current, hence its voltage remains approximately constant. As shown in FIG. 2, the discharge current decays exponentially and its decay time is dependent on the value chosen for capacitor C1. In FIG. 2, the discharge rate is shown to be about 10 milliamperes per 25 milliseconds. As the discharge current approaches zero, the current through the collector of Q2 reduces, causing transistor Q1 to come out of saturation and the output current to switch to zero. This is shown as the small step at the end of the pulse illustrated in FIG. 2.

It may be noted that diode ZD2 prevents the generation of noise on the telephone line because of repeated operation ("playing with") of the key S. Operating the reply key S does not trigger the current pulse generator 30 until C1 has recharged enough to cause C2 to charge to a voltage such that the trigger signal generated at the junction of resistors R3 and R4 plus the voltage on capacitor C2 is greater than the zener voltage of ZD2 plus the base-emitter threshold voltage of transistor Q1.

Figure 4:
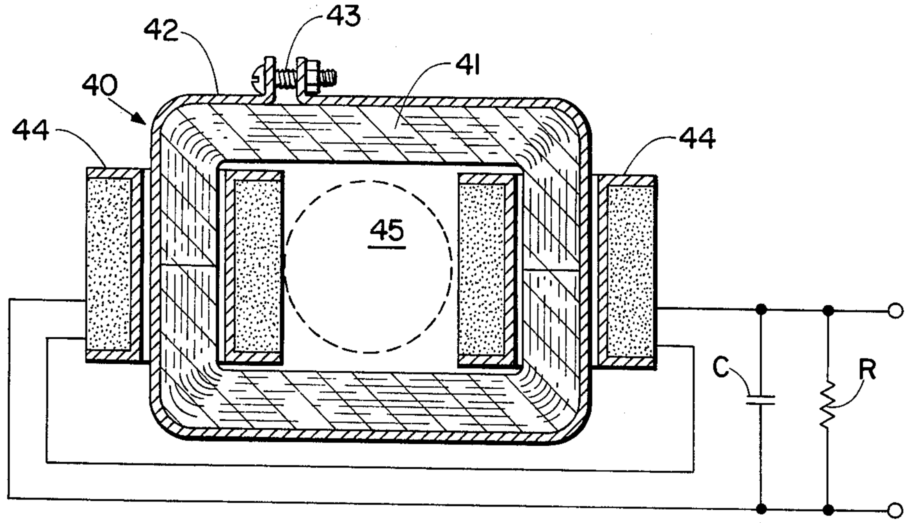
FIG. 4 is a pictorial diagram of the detector shown in FIG. 1.

FIG. 4 is a pictorial diagram of the detector 17 shown in FIG. 1 of the drawings. There is shown a cross-sectional view of a current sensing transformer 40 having a core 41 of magnetic material which may be made of grain-oriented silicon steel tape. The core 41 may be split in two sections and held together with a steel band 42 and a fastening means 43 which may be a nut and bolt arrangement or any other conventional fastening means. A pair of bobbins 44 mounted on the core 41 carry a secondary winding comprising a large number of turns of insulated conductor. As shown in the drawing, the cross-sectional area 45 bounded by the bobbins 44 and the core 41 should be made just large enough to accommodate one of the cable 16 connecting the horizontals of the MDF 13 to the central office switching equipment as shown in FIG. 1. Each pair of the cables passing through the transformer 40 serves as a one-turn primary winding whereas the windings on the bobbins 44 serve as the secondary winding. A secondary winding wound on only one bobbin is sufficient to obtain an output signal, however, it is preferable to wind the secondary winding on two bobbins, as shown. because when they are connected in series aiding for the desired output signal, the voltages induced by external fields tend to cancel.

The operation of the transformer is as follows:

The number of magnetic lines of force (flux) in a transformer core is given by:

$$\phi = \frac{\mu A n_1 I}{l} K$$

$\mu$ = the magnetic permeability of the core material,
A = the cross-sectional area of the core, $n_1$ = the number of turns of wire,
I = current flowing in the wire
l = mean length of magnetic flux lines, and
K = proportionality constant.

Assuming no current flow in the secondary winding of the transformer, the flux in the sensor core is directly proportional to the current flow represented by the current pulse illustrated in FIG. 2.

The voltage induced in the secondary winding is proportional to $(n_2 d\phi/dt)$ where $n_2$ = number of turns of wire in the secondary winding. The differential of $\phi$ with respect to time, $(d\phi/d)$, represents the idealized output voltage from the sensor terminals.

Figure 5:
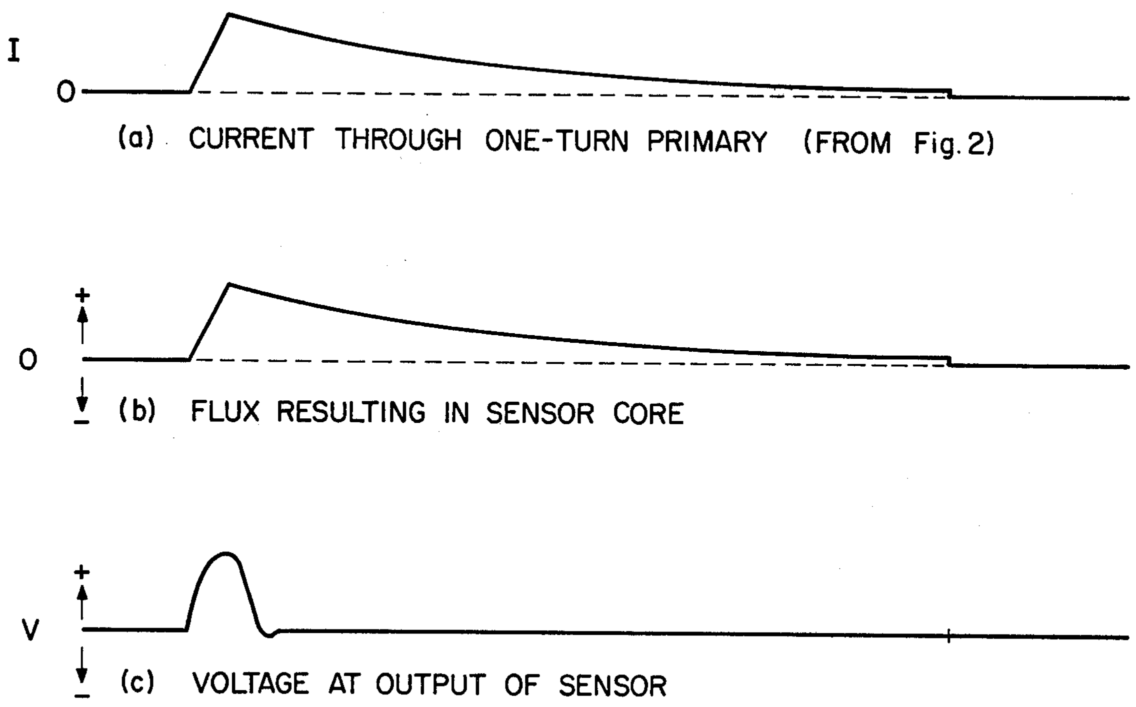
FIG. 5 is a diagram of the waveforms at the detector of FIG. 4.

FIG. 5 shows the waveforms related to the transformer 40. The (*a*) waveform represents the current pulse flowing through the tip lead of one of the pairs of the cable 16 passing through the transformer 40. Waveform (*b*) represents the flux generated in the transformer core 41 whereas waveform (*c*) shows the voltage wav̦eform generated at the output leads of the secondary winding. These waveforms are related to a yes reply generated by the signal generator 15 of FIG. 1. For a no reply the direction of the signals shown in FIG. 6 is reversed.

An important advantage of using a current pulse signalling system such as that described above now becomes evident. The strength of the received signal is independent of the subscriber loop impedance — at least within the conventional impedance range thereof. This is because the pulse consists of a controlled current and what varies, as the tip-to-ground impedance varies, is the voltage generated at the current injection point.

Due to the self-capacitance of the secondary winding, resonance may tend to occur and it may be necessary to terminate the sensor terminals in a resistance R (FIG. 4) low enough to critically damp the resultant oscillations. It may also be advantageous to terminate the sensor with a capacitor C (FIG. 4) to lower the resonant frequency of the combination and effectively use the inductance of the secondary winding and these capacitances together as a low pass filter to suppress at lease partially the noise that appears at the sensor terminals.

Figure 6:
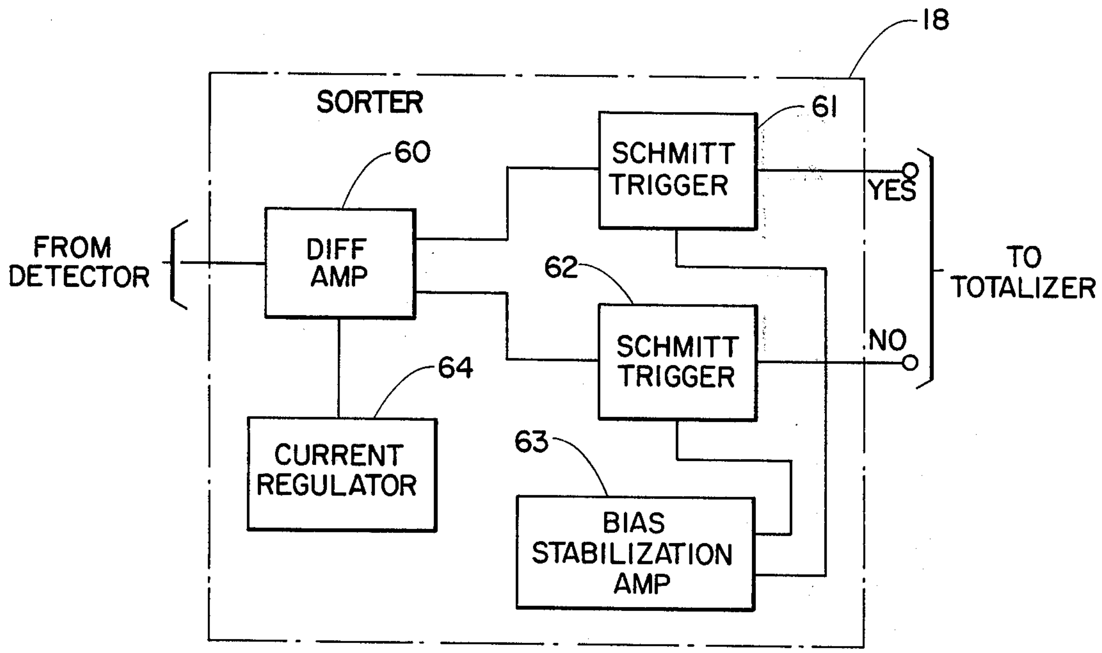
FIG. 6 is a block diagram of the reply sorter circuit shown in FIG. 1.

FIG. 6 is a circuit block diagram of the vote sorter 18 shown in FIG. 1, A differential amplifier 60 has its input connected to the detector 16 of FIG. 1 and a pair of outputs each one connected to a respective input of Schmitt trigger circuits 61 and 62. A bias stabilization amplifier 63 is connected to the Schmitt trigger circuits 61 and 62 to ensure that the positive and negative thresholds thereof remain equal in magnitude. A current regulator circuit 64 may be connected to the differential amplifier 60 to ensure symmetrical operation thereof.

When a pulse from the detector 17 is applied to the vote sorter of FIG. 6, the differential amplifier 60 directs it to the appropriate threshold level circuit 61 or 62 which in turn provides a logic pulse corresponding to the signal generated by the incast signal generator 15 of FIG. 1. Thus, for each vote registered in a group of subscriber loops (i.e. 100), a pulse appears at the yes output for each yes reply and at the no output for each no reply.

OPERATION

As discussed previously, this system is envisaged as an incasting system for use by anyone who has access to a telephone subscriber loop. In response to a question transmitted over a broadcasting facility such as radio or television, listeners and/or viewers are given a predetermined period of time (e.g. 10 seconds) to register their reply on the question asked. In response to the question, the subscribers who wish to participate in the poll operate the key of their signal generator 15 to the yes or no position, thereby causing a current pulse representative of their reply to be generated. This current pulse is applied to the tip lead of the subscriber telephone loop and local ground and is received by detector 17 located in the local central office. The detector 17 provides a signal to the reply sorter circuit 18 which in turn generates a signal for use by a totalizer circuit 19. After the allocated 10 seconds, the totalizer along with other conventional transmission circuitry sends the result to the pollster. Because the response time of this system is so fast, the answers from the listeners and/or viewers can affect subsequent questioning.

As described above, each detector 17 responds to the signals which may appear on any pair of its associated cable (100 pair cable). If any two of these paths carry opposite signals (one yes reply and one no reply) at exactly the same period in time, the signals cancel out and those replies are not registered. However, it has been found that both practically and statistically, this occurrence is not a problem as it is very unlikely. There are a number of reasons for this. The detector and reply sorter circuits provide a signal to the totalizer in less than five milliseconds. Assuming a ten seconds replying period, (which is minimal in view of typical physical human response) there are 2,000 reply slots in which to process a maximum of one hundred signals. Of course, this is assuming that all of the pairs in the cable associated with any one detector belong to subscribers who are all equipped with an incast signal generator circuit and who are all watching the same television program or all listening to the same radio program and who all wish to participate.

This system provides a truly interactive participative broadcasting system which is both practical and economical. Since it uses the telephone subscriber loop network as the incasting communication link it is available for use by almost everyone. The incast signal generator circuit does not load the subscriber line because it is isolated from it by a very high impedance and is simply connected in parallel with the subscriber telephone set. It also does not require a separate power supply as it draws power from the loop. The detector circuitry may be installed without requiring interruption of service since it has no direct electrical connection to the telephone lines. In other words, the system of the invention simply uses the telephone system as a convenient transmission facility without cutting into it and without affecting its normal operation. It may be noted that multiple replies on the same question may be prevented simply by making the recharge time of the incast signal generator circuitry longer than the replying interval. Also, it is entirely possible to register a reply while the telephone set is off-hook; however, the signal generator circuit will not recharge as long as it is off-hook because the current drawn by the telephone subset reduces the ring-to-tip voltage to well below the voltage necessary to recharge it (48 volts).

An alternative mode of operation for the above-described system is that of a true polling network. For example, it is known that a one percent accuracy at the 50 percent confidence level may be achieved by polling approximately twelve hundred people. Therefore, by providing sufficient incast signal generators such that during a particular poll there are responses available from 1,200 incasters, a true polling network is achieved. To receive these replies, the same number of detector circuits may be provided at the ratio of one reply per detector. That is, one of the pairs in the cable passing through the detector is associated with one incast signal generator. In this way, it may be seen that the allocation of the incast signal generator to subscribers may be changed from time to time while retaining the same total number and without having to relocate the detectors. Also, inferencing of the polling results is possible because the identity and characteristics of the sources are known.

The incasting system described herein may readily be adapted to achieve a true polling network in combination with the interactive participative broadcasting system as described above by providing the participants of the true polling network with modified incast signal generators which transmit coded incast reply signals. For example, these signals may comprise a positive current pulse followed a predetermined interval of time later by a negative current pulse. The reply sorters associated with the participants of the true polling network may also be readily adapted to recognize the coded signals.

Of course, it should be realized that some of the concepts embodied in the above-described incasting system may be adapted for use with other than the telephone system. For example, a large auditorium may be wired to simulate the telephone system with some or all of the seats representing an incast source and the replies may be detected using circuitry which performs an "OR" function thereon. In this way, the economy associated with the detector circuitry of applicant's invention is realized.

What is claimed is:

1. An incasting communication system comprising:

a plurality of distributed sources;

a central sink;

a plurality of communication paths for connecting said sources to said sink;

means located at each of said sources for generating and transmitting on a respective one of the paths a signal having predetermined characteristics; and means located at the sink for detecting the presence of said signal on any one of a plurality of said communication paths, said detector means being concurrently connected to said plurality of communication paths.

2. An incasting communication system using the telephone network for the transmission of signals from distributed sources to a central sink, comprising:

means located at each of said distributed sources for generating and transmitting on respective subscriber telephone lines a signal having predetermined characteristics; and means located at the central sink for detecting the presence of said signals, said detector means being connected to a plurality of said telephone lines.

3. An incasting system using the telephone network for the transmission of signals from subscriber terminals to a central office, comprising:

signal generator means located at each of said subscriber terminals for generating and transmitting on a respective telephone line an incast signal having predetermined characteristics, said signal generator means being connected across said respective telephone line in parallel with its associated conventional telephone subset;

detector means located at the central office for inductively detecting the presence of said signal, said detector means being connected to a plurality of said telephone lines and being responsive to the signal appearing on any one of said plurality of telephone lines for providing a corresponding output signal.

4. An incasting system as defined in claim 3 wherein said incast signal comprises at least one current pulse having a predetermined shape whereby a minimum of impulse noise is caused to be generated and wherein said pulse is transmitted between one side of the telephone line and ground.

5. An incasting system as defined in claim 4 wherein said signal generator means comprises a capacitance element, a current pulse generator and shaper, and switch means for connecting said capacitance element through a high impedance to the tip and ring leads of the subscriber loop in a first position, and for connecting said capacitance element to ground and to one side of the telephone line through said current pulse generator and shaper in a second position, whereby said capacitance element charges up in said first position and discharges through said current generator and shaper in said second position to cause said current pulse to be generated and transmitted on the line.

6. An incasting system as defined in claim 5 further comprising a visual indicator serially connected between said signal generator means and said one side of the telephone line for indicating that said current pulse has been transmitted.

7. An incasting system as defined in claim 4 wherein said detector means is a current sensing transformer comprising, a core of magnetic material adapted to have a plurality of conductors passing therethrough, each of said conductors forming a primary winding, and a secondary winding comprising a plurality of turns of wire wound about said core, said transformer being adapted to provide an output signal on the output leads of said secondary winding in response to said current pulse passing through at least one of said conductors.

8. An incasting system as defined in claim 7 wherein the secondary winding of the transformer is divided in two halves, each half comprising a plurality of turns of wire wound about a respective portion of the core and the two halves being connected in series aiding for the desired signal.

9. An incasting system as defined in claim 8 wherein said detector means further includes a damping circuit comprising a parallel circuit of a resistance element and a capacitance element connected across the output leads of the secondary winding of the transformer.

10. An incasting system using the telephone network for the transmission of signals from distributed sources to a central source, comprising:

signal generator means located at each of said distributed sources for generating and transmitting on a respective telephone line a signal having predetermined characteristics;

detector means located at the central sink for inductively detecting the presence of said signal, said detector means being responsive to the signal appearing on any one of a plurality of said telephone lines for providing a corresponding output signal; and circuit means responsive to said output signal for validating it as to amplitude and identifying it as to polarity and for providing corresponding signals to a totalizing circuit.

11. An incasting system as defined in claim 10 wherein said circuit means comprises:

a differential amplifier having its input terminal connected to receive said output signal from said detector means and a pair of output terminals;

a pair of threshold circuits each having its input terminal connected to a respective one of the output terminals of the amplifier and a pair of output terminals for providing said corresponding signals.

* * * * *